[11] 3,586,107

| [72] | Inventor | David R. Parrish |
| | | Tulsa, Okla. |
| [21] | Appl. No. | 7,481 |
| [22] | Filed | Feb. 2, 1970 |
| [45] | Patented | June 22, 1971 |
| [73] | Assignee | Pan American Petroleum Corporation |
| | | Tulsa, Okla. |

[54] CARBON DIOXIDE SLUG DRIVE
6 Claims, 2 Drawing Figs.
[52] U.S. Cl. .................................................. 166/273
[51] Int. Cl. ............................................ E21b 43/20, E21b 43/22
[50] Field of Search .......................................... 166/273, 274, 266, 256, 268

[56] References Cited
UNITED STATES PATENTS

| 2,822,872 | 2/1958 | Rzasa et al. | 166/273 |
| 2,875,832 | 3/1959 | Martin et al. | 166/266 |
| 2,968,350 | 1/1961 | Slobod et al. | 166/273 |
| 3,174,543 | 3/1965 | Sharp | 166/256 |
| 3,196,945 | 7/1965 | Craig, Jr. et al. | 166/261 |
| 3,256,933 | 6/1966 | Murphree et al. | 166/266 |
| 3,262,498 | 7/1966 | Connally, Jr. et al. | 166/273 |
| 3,295,601 | 1/1967 | Santourian | 166/263 |
| 3,344,856 | 10/1967 | Lange | 166/266 X |
| 3,410,341 | 11/1968 | Brigham et al. | 166/273 |

*Primary Examiner*—Stephen J. Novosad
*Attorney*—Paul F. Hawley

ABSTRACT: A slug drive to recover medium- to high-gravity petroleum from underground formations is carried out by injecting $CO_2$ into the petroliferous formation. A typical amount used is of the order of 5 percent to 20 percent, say, 10 percent of the pore volume of the hydrocarbons present in the portion of the reservoir being treated. This $CO_2$ is immediately followed by approximately an equal volume of air or flue gas, and then by water. Flue gas may be injected after or with the water. The gas immediately following the $CO_2$ (flue gas or air) very effectively displaces the $CO_2$ which is miscible with the petroleum of the reservoir. The following gas is both cheaper than the $CO_2$ and serves as a protective bank, since the gas immediately ahead of the waterflood is to a degree trapped in passing through the reservoir. An additional benefit obtained by driving the $CO_2$ bank with a gas (air or flue gas) less soluble in water is an improvement in mobility ratio, hence in sweep efficiency.

DAVID R. PARRISH
INVENTOR.

BY Paul F Hawley

ATTORNEY.

CARBON DIOXIDE SLUG DRIVE

BACKGROUND OF THE INVENTION

Miscible slug drive is a procedure which is becoming more popular in secondary and tertiary oil recovery. This process, which was taught in the Morse U.S. Pat. No. 3,354,953, involved the concept of driving the petroleum through permeable channels in the formation by a material which was at least partially, and preferably, totally miscible with the petroleum ahead of it and with a follower fluid, for example natural gas or water. These follower fluids were used to improve the economics of the drive in that the least volume of miscible slug need be employed.

In the prior art there have been reports of a large number of variations on this basic process, some of which have been field tested, and others only proposed. As background for this invention, it should be mentioned that the use of carbon dioxide as the primary injected solvent has been both taught and practiced. Under reservoir conditions of temperature and pressure, carbon dioxide is a dense phase (i.e., ordinarily above the critical temperature of 88° F.) which becomes essentially completely soluble in medium to high API gravity petroleum (of the order of 30° to 40° API or more).

The Martin et al. U.S. Pat. No. 2,875,832 teaches injecting a mixture of $CO_2$ and a very light petroleum solvent, such as LPG, which is forced through the formation. Holm U.S. Pat. No. 3,075,918 also teaches oil recovery processes using as flooding material a mixture of a light hydrocarbon and $CO_2$. The Slobod et al. U.S. Pat. No. 2,968,350 teaches a procedure for flooding wells in which a miscible slug is injected through input wells, followed by hydrocarbon gas, which in turn is followed by the ultimate flooding water. Much, and usually all, of the hydrocarbon has will be trapped and overrun by the water in the course of the flood. This phenomenon of gas trapping is overcome in my invention not by elimination, but by substitution. Slobod et al., incidentally mention use of $SO_2$ and $H_2S$ in the miscible slug, but do not mention use of $CO_2$. Murphree et al. U.S. Pat. No. 3,256,933 teaches the use of a bank of $CO_2$ followed by natural gas, essentially methane. Murphree et al. distinctly do not teach the use of water in the flooding technique of their patent. This is an essential part of this disclosure. Connally, Jr., et al. U.S. Pat. No. 3,262,498 calls for a miscible slug drive in which a bank of $CO_2$ is followed by a bank of light hydrocarbons, such as LPG, which is propelled through the formation by natural gas, essentially methane. (The inverse in the order of solvents was earlier taught in Rzasa et al. U.S. Pat. No. 2,822,862, in which an initial bank of LPG was followed by a bank of $CO_2$ and then by a natural gas flood.) Santourian U.S. Pat. No. 3,295,601 again calls for a bank composed of a mixture of $CO_2$ and LPG which may be followed by natural gas, flue gas, steam, air, water, etc. Brigham et al. U.S. Pat. No. 3,410,351 calls for an oil recovery process using a bank of $CO_2$ followed by LPG, followed by natural gas and water.

The Santourian U.S. Pat. No. 3,295,601 teaches a cycling technique in which a preferred composition of a solvent bank (about 50 percent $CO_2$, a substantial concentration of $C_2$—$C_4$ hydrocarbon gases, and possibly others) is driven in and out of an injection well. After forcing this mixture into the well, the pressure is alternated between a higher and lower value, to build up an annular transition zone. The procedure set out in the current invention does not require reduction of fluid pressure in the well during or after injection of the initial miscible slug. In many cases, lowering this pressure would result in a loss of miscibility. A buffer zone of air or flue gas is created back of the miscible slug which is therefore maintained at minimum total volume (a considerably cheaper procedure) and the buffer zone is ultimately followed by water. This procedure effects considerable economies over that taught by the Santourian process, as well as by the others mentioned above. The principal advantage is that my process avoids trapping the relatively expensive $CO_2$ by water invasion.

SUMMARY OF THE INVENTION

A miscible slug drive is carried out using initially a slug of $CO_2$ which is mutually soluble with the crude oil in the reservoir. The volume of the slug employed is preferably from around 3 percent to 10 percent of the hydrocarbon pore volume of the past of the reservoir being flooded. The $CO_2$ is followed in any injection well by a cheaper and more readily available gas, such as air or flue gas. The volume of this buffer gas is approximately equal to that of the $CO_2$ displaced. In turn this buffer gas is followed by flood water which is forced through the reservoir, driving the buffer zone and the $CO_2$ bank ahead of it, and thus displacing oil miscibly to the production wells. Alternatively, simultaneous or alternate injection of air with the injected water can take place.

DESCRIPTION OF THE PREFERRED EMBODIMENT

The general principles lying behind the miscible slug drive process for recovery of oil from a subterranean reservoir have been well taught in the technical literature as well as the patents which have been referred to above. See particularly Morse U.S. Pat. No. 3,354,953. One suitable miscible material for light crude oils is carbon dioxide, which again has been recognized in this literature. One of the cheapest and most available pusher fluids is ordinary water. The difficulty in using water directly following a bank of $CO_2$ is that a significant portion of the CO 2 becomes trapped by the invading water. If it were not for this phenomenon, it would be very desirable to use water due to its higher viscosity (lower mobility) which reduces its tendency to finger through the lower viscosity material being driven by the water. This is particularly unfortunate since use of carbon dioxide involves a lower cost for the miscible slug than in the case of other miscible materials, such as LPG for example. Thus if a gas-driven LPG-type miscible flood were to be employed, a typical volume of the slug would be about 5 percent of the hydrocarbon pore volume of the reservoir being flooded. Since only a portion of a $CO_2$ bank is effective in displacing oil, a significantly larger volume of $CO_2$ must be injected to compensate for the trapping of the $CO_2$ by the invading water. Accordingly, if it is desired to use about 5 percent hydrocarbon pore volume for the $CO_2$ miscible slug, approximately four times this volume (20 percent hydrocarbon pore volume) must be used, since typically about three-fourth of its will be trapped by water invasion.

Figure 1:
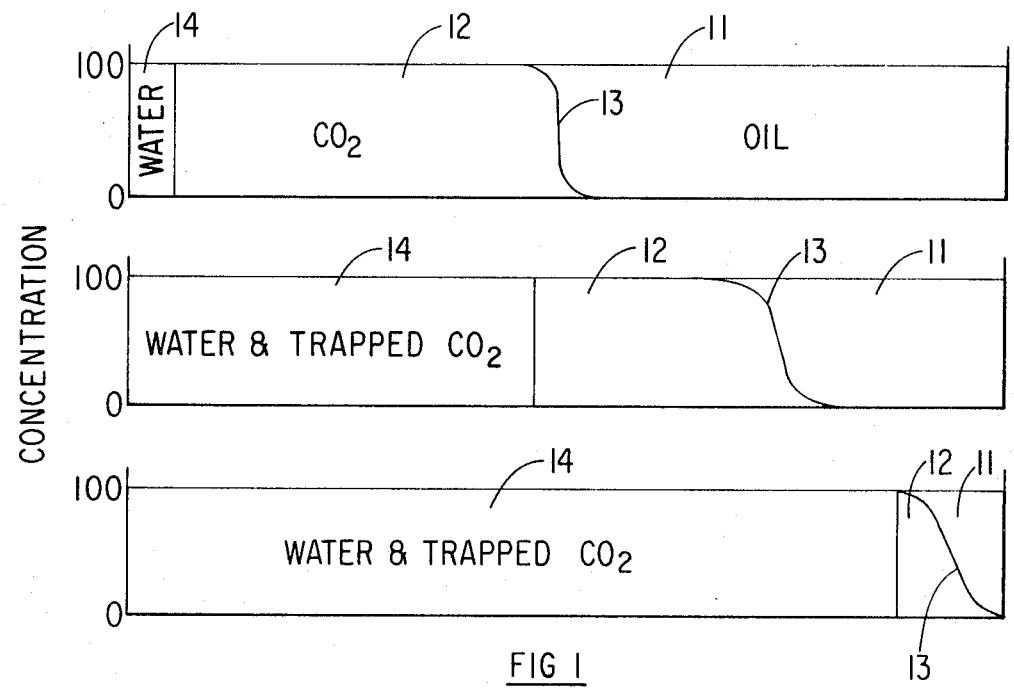
FIG. 1 shows a schematic diagram involving displacement of crude oil through a reservoir by a bank of carbon dioxide which in turn is followed by a waterflood, illustrating loss of $CO_2$ by trapping.

Thus in FIG. 1 there is shown a concentration plot for three different periods of time for the water, carbon dioxide, and oil present in a reservoir. 100 percent concentration of a material (in terms of hydrocarbon pore volume, i.e., original hydrocarbon-filled portion of the system) is represented at the top of each chart and zero at the bottom. The injection well is assumed to be at the left of the chart and the production well at the right-hand extremity. Early in the drive effectively all of the $CO_2$ injected lies in zone 12 to the left of the petroleum-containing zone 11. The mixing or miscible zone is shown by the curved line 13, illustrating concentration change from the leading edge of the $CO_2$ bank toward the left. The waterbank in zone 14 follows the $CO_2$, and as it proceeds through the reservoir, traps some of the $CO_2$ during the passage.

This trapping mechanism is well known in the petroleum literature. It may be explained as follows: Passage of the miscible solvent (in this case, $CO_2$) essentially cleans out the petroleum originally present in a pore, leaving it filled with $CO_2$. Ultimately the $CO_2$ is contacted by the water following, and some of the $CO_2$ is expelled from the pore. However, there is an interfacial force on the $CO_2$, a coalescing force, which becomes stronger as the size of the $CO_2$ bubble in the pore becomes smaller, and frequently becomes sufficient so that after expulsion of some $CO_2$, that remaining forms an approximately spherical "bubble," which will not pass through the smaller exit from the pore, and hence remains in place while the flood water flows by it. It would require a much greater differential pressure across the pore than is present in an economic waterflood to remove this trapped $CO_2$. As a result, from about 25 percent to around 35 percent of the pore volume of $CO_2$ originally present in this pore remains in place. As water contacts more and more of the reservoir, the volume of $CO_2$ being forced through the reservoir decreases. The same kind of phenomenon occurs if the $CO_2$ is replaced by, for example, air or flue gas.

As result of the trapping mechanism, by the time the waterflood has progressed to the point shown in the second chart, a considerable amount of the volume of $CO_2$ initially injected in the bank 12 has become trapped in the water zone 14. Still later, when $CO_2$ has just reached the production well, only if the design has been quite adequate will the situation be as shown in the third bar chart in FIG. 1, i.e., the water zone 14 has penetrated to the points in the formation where the $CO_2$ bank in zone 12 has just reached a concentration of 100 percent. If sufficient $CO_2$ has not been initially placed in the zone, still further trapped $CO_2$ will be in zone 14, and the miscible slug of $CO_2$ will no longer reach a concentration of 100 percent. In such case the water will be directly driving the oil during the latter part of the drive, at the lower displacing efficiency well known in ordinary waterflooding.

Figure 2:
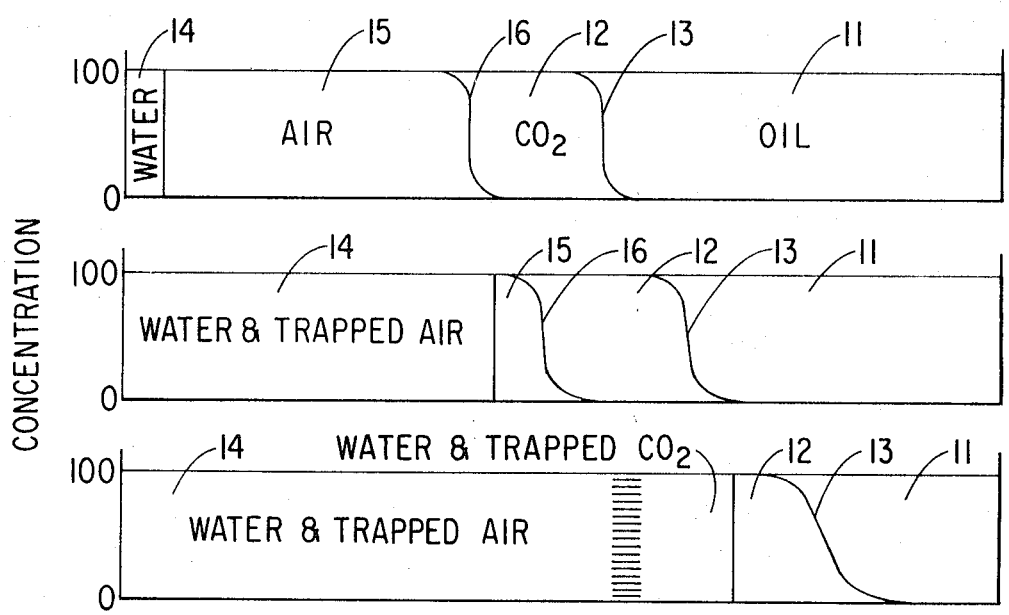
FIG. 2 illustrates in a similar schematic diagram a miscible slug drive in accordance with my invention in which there is interposed between the $CO_2$ bank and the flood water a buffer zone of air or flue gas.

The method of my invention avoids the trapping of the miscible slug by the propelling water, as illustrated graphically in FIG. 2. In the top chart is shown the condition in which water has just entered the formation. The volume of $CO_2$ used in appreciably smaller than in the case illustrated in FIG. 1; for example, it is about one-half of that shown in that FIGURE. In between the $CO_2$ bank in zone 12 and the flood water in zone 14 is the buffer zone 15, preferably approximately of the same volume as the miscible $CO_2$ bank. Material used is an inexpensive and readily available gas, such as air, or flue gas. It is miscible with $CO_2$ under reservoir conditions, so there is a miscible mixing zone 16 between the $CO_2$ and the air or flue gas. At the tail end the water in zone 14 drives the air, just as in FIG. 1 it drove the $CO_2$. As a result, there is essentially the same trapping mechanism effective in the portion of the reservoir contacted by water as there was in the first case. However, the trapped material in this case is air, not $CO_2$. At the point shown in the second chart of FIG. 2, most of the air initially in zone 15 has been trapped in the water zone 14. As the floor continues, essentially all of the air is trapped and the water now commences trapping the $CO_2$. If the volume relations given above have been followed, by the time the $CO_2$ breaks through at the production wells there will be just sufficient $CO_2$ left in bank 12 to produce a 100 percent concentration just in front of the leading edge of the floodwater in zone 14. The trapped $CO_2$-water zone is in advance of the water-trapped air zone in the reservoir.

The prior art has already taught extensively about the volume of miscible slug which will theoretically force the petroleum through the reservoir to the producing wells, if there is no essential loss in this slug volume. As stated above, I prefer to inject a volume of $CO_2$ substantially twice this ideal volume. Typical ideal volumes are of the order of 3 percent to 10 percent of the hydrocarbon pore volume. Thus my invention calls for the use of approximately 5 percent to about 20 percent of the hydrocarbon pore volume of $CO_2$, for example 10 percent, followed by a volume of air or flue gas at least equal to this.

The flue gas or air is less soluble in water than the $CO_2$, and more air remains as a free (undissolved) gas phase. This free gas lowers the effective permeability to water, thus improves the mobility ratio and hence the sweep efficiency.

If desired, before all of the air has been compressed and injected into the reservoir, one can commence the injection of the water, and then alternate air-water injection, or carry out simultaneous injection of the remaining air with the early part of the flood water.

As an example of the savings that can be effected, in one large reservoir unit in Central Texas plans were made to inject a large volume of $CO_2$ at a cost of about $70 million. The $CO_2$ was to be purchased from other fields, compressed, pipelined over 100 miles, still further compressed, and then injected into the reservoir. The cost of the $CO_2$ at point of injection was approximately twice its purchase price at the original source. Omitting the purchase and pipelining of approximately one-half of the $CO_2$ by substituting air or flue gas for the latter half of the $CO_2$ to be injected results in a savings of about $35 million in this case. Alternatively, the same amount of available $CO_2$ may be used in my invention to flood a much larger portion of the field.

I realize in not all cases is liquid carbon dioxide miscible with petroleum. It is not possible to predict with exactness whether miscibility can be obtained with $CO_2$ in a specific crude oil. Existing data on $CO_2$-crude oil systems indicate the minimum miscibility pressure generally is about 1,200 to 1,500 p.s.i. for high-gravity, volatile crudes of the order of 30° to 40° API, or more. Crude oil characteristics other than gravity also enter into miscibility requirements (e.g., the degree of aromaticity). Another characteristic which enters into the miscibility is the fact that as the $CO_2$ forces oil through the formation, it is found that the $CO_2$ becomes more miscible with the crude oil. This seems to be at least in part due to light components of the petroleum dissolving into the $CO_2$ bank. It is also found that the purity of the $CO_2$ is a factor to be considered. It is found that $CO_2$ containing an appreciable quantity of methane can be employed, but in this case the pressure at which miscibility is achieved is a little higher than that for the pure $CO_2$. For example, in one case $CO_2$ containing 25 percent methane is miscible with a particular crude at 3,000 p.s.i., whereas in the case of pure $CO_2$ this minimum pressure is 1,300 p.s.i., and an 18 percent methane contamination results in miscible condition at 2,000 p.s.i. In general, it may be said that those crude oils which in the reservoir have an API gravity of at least 30° should be considered for a drive in accordance with this invention. It is best to obtain a sample of the crude oil being considered, contact it with $CO_2$ under reservoir conditions of temperature and pressure, and determine in the laboratory (preferably by drive through at least a 10-foot-long permeable rock core) whether miscibility, in fact, exists. Where such miscibility does exist, essentially 100 percent displacement of the oil in the zone contacted by the $CO_2$ bank should result.

Vertical distribution of the $CO_2$ in ordinary, inhomogeneous reservoirs will be poorer than for a conventional waterflood. Ordinarily the high displacement efficiency of the $CO_2$ bank more than offsets poorer vertical distribution or other effects due to the use of $CO_2$. To improve the vertical distribution of the $CO_2$ and possibly to improve areal sweep efficiency, it is suggested that a small volume of water, which may be up to 1 percent hydrocarbon pore volume, typically 0.1 percent hydrocarbon pore volume, be injected into the reservoir prior to the injection of the $CO_2$.

If this process is employed after the petroleum reservoir has already been waterflooded (i.e., tertiary operation), additional $CO_2$ is required to saturate the water not displaced by the $CO_2$. This may amount to as much as one-sixteenth more volume than that specified above.

I claim:

1. A process for the recovery of petroleum present in an underground porous and permeable formation penetrated by at least one injection and at least one production well comprising the steps of injecting carbon dioxide through said at least one injection well into said formation in an amount corresponding to from about 5 to about 20 percent of the hydrocarbon pore volume of that part of the formation being treated, said carbon dioxide being miscible with said petroleum under the temperature and pressure conditions of said formation, injecting thereafter into said formation via said injection well a gas selected from the group consisting of air and flue gas in volume at least substantially equal to that of said carbon dioxide, thereafter injecting water into said injection well and into said formation to propel said gas and said carbon dioxide through said formation toward said at least one production well, and producing petroleum from said production well.

2. A process according to claim 1 in which said petroleum is crude oil having an API gravity of at least about 30° and in which the pressure in said formation on said carbon dioxide is at least about 1,200 p.s.i.

3. A process according to claim 2 including the step of injecting water simultaneously with the injection of the last part of said gas.

4. A process according to claim 2 including the step of injecting a minor amount of said water before the injection of the last part of said gas, the remainder of said water being injected following the final injection of said gas.

5. A process according to claim 2 including the step of injecting a volume of water amounting to about 0.1 percent to 1 percent of the hydrocarbon pore volume of that part of the formation being processed before said injection of carbon dioxide.

6. A process according to claim 2 including the step of injecting part of said water before the injection of the last part of said gas.

PO-1050
(5/69)

UNITED STATES PATENT OFFICE
CERTIFICATE OF CORRECTION

Patent No. 3,586,107      Dated June 22, 1971

Inventor(s) David R. Parrish

It is certified that error appears in the above-identified patent and that said Letters Patent are hereby corrected as shown below:

Column 1, line 49, "U.S. Pat. No. 2,822,862" should read --U.S. Pat. No. 2,822,872--.

Column 1, line 54, "U.S. Pat. No. 3,410,351" should read --U.S. Pat. No. 3,410,341--.

Column 2, line 7, "past" should read --part--.

Column 2, line 56, "its" should read --it--.

Column 3, line 52, "floor" should read --flood--.

Column 4, line 65, "one-sixteenth" should read --one-sixth--.

Signed and sealed this 21st day of December 1971.

(SEAL)
Attest:

EDWARD M. FLETCHER, JR.      ROBERT GOTTSCHALK
Attesting Officer      Acting Commissioner of Patents